United States Patent [19]
Cho et al.

[11] Patent Number: 5,011,514
[45] Date of Patent: Apr. 30, 1991

[54] CEMENTED AND CEMENTED/SINTERED SUPERABRASIVE POLYCRYSTALLINE BODIES AND METHODS OF MANUFACTURE THEREOF

[75] Inventors: Hyun S. Cho; Chien-Min Sung, both of Sandy; Leo Merrill, Orem; Sy-Hwa Chen; Frank Csillag, both of Salt Lake City, all of Utah

[73] Assignee: Norton Company, Worcester, Mass.

[21] Appl. No.: 378,123

[22] Filed: Jul. 11, 1989

Related U.S. Application Data

[63] Continuation-in-part of Ser. No. 226,049, Jul. 29, 1988.

[51] Int. Cl.$^5$ .............................................. B24D 11/00
[52] U.S. Cl. ...................................... 51/295; 51/293; 51/308; 51/309
[58] Field of Search ................. 51/293, 295, 308, 309

[56] References Cited

U.S. PATENT DOCUMENTS

| | | | |
|---|---|---|---|
| 3,316,073 | 4/1967 | Kelso | 51/309 |
| 3,356,473 | 12/1967 | Hull | 51/309 |
| 3,650,714 | 3/1972 | Farkas | 51/295 |
| 3,757,878 | 9/1973 | Wilder et al. | 175/329 |
| 3,757,879 | 9/1973 | Wilder et al. | 175/329 |
| 3,841,852 | 10/1974 | Wilder et al. | 51/295 |
| 3,871,840 | 3/1975 | Wilder et al. | 51/295 |
| 3,879,901 | 4/1975 | Caveney | 51/295 |
| 4,011,064 | 3/1977 | Lee et al. | 51/295 |
| 4,063,909 | 12/1977 | Mitchell | 51/309 |
| 4,142,869 | 3/1979 | Vereschagin et al. | 51/295 |
| 4,184,853 | 1/1980 | Otepkov et al. | 51/295 |
| 4,247,304 | 1/1981 | Morelock | 51/295 |
| 4,378,975 | 4/1983 | Tomlinson et al. | 51/309 |
| 4,399,167 | 8/1983 | Pipkin | 51/309 |
| 4,403,015 | 9/1983 | Nakai et al. | 428/565 |
| 4,539,018 | 9/1985 | Whanger et al. | 51/295 |
| 4,776,861 | 10/1988 | Frushour | 51/293 |
| 4,776,862 | 10/1988 | Wiand | 51/293 |

FOREIGN PATENT DOCUMENTS 0012631 6/1980 European Pat. Off. .

Primary Examiner—William R. Dixon, Jr.
Assistant Examiner—Willie J. Thompson
Attorney, Agent, or Firm—Marmorek, Guttman & Rubenstein

[57] ABSTRACT

Superabrasive cutting elements, backed compacts and methods for their manufacture are disclosed wherein metal coated superabrasive particles are cemented under HPHT conditions. The superabrasives bond to the metal of the coating and the metal coatings of adjacent particles bond to each other forming a matrix. A binding aid with thermal expansion characteristics close to that of the superabrasive particle can be infiltrated through or otherwise mixed with the particles to assist in the bonding between the metal coatings and to fill in voids. Catalyst and non-catalyst binding aids can also be used. Uncoated, smaller superabrasive particles can be interstitially dispersed among the coated particles to increase the superabrasive concentration and can self bond to form a cemented/sintered structure. Tungsten is a preferred metal coating and silicon is a preferred binding/sintering aid. The superabrasive can be diamond, cubic boron nitride, boron doped diamond or crushed sintered polycrystalline aggregates. The free-standing cutting element can have a brazeable layer and the compact can be backed with, for example, cemented tungsten carbide. Free-standing cutting elements can be thermally stable up to 1,200° C. Backed compacts can be thermally stable up to 1,100° C.

39 Claims, 3 Drawing Sheets

CEMENTED AND CEMENTED/SINTERED SUPERABRASIVE POLYCRYSTALLINE BODIES AND METHODS OF MANUFACTURE THEREOF

REFERENCE TO PRIOR APPLICATION

This is a continuation-in-part of application Ser. No. 226,049, filed July 29, 1988, pending.

FIELD OF THE INVENTION

The present invention relates to superabrasive cutting elements for tools and, more particularly, to cemented and cemented/sintered cutting elements and backed compacts of metal coated diamond and cubic boron nitride crystals and processes for the manufacture thereof.

BACKGROUND OF THE INVENTION

Composite polycrystalline abrasive masses or compacts composed of diamond or cubic boron nitride ("CBN") crystals are widely used in industry as cutting elements in drill bits, in dressing or cutting tools, in machining tools, woodworking tools, and wire drawing dies. Such compacts have demonstrated advantages over single crystal cutting elements, such as better wear and impact resistance.

Compacts have been formed by sintering individual diamond particles together under the high pressure and high temperature ("HPHT") conditions referred to as the "diamond stable region," typically above 40 kbars and between 1,200° C.–2,000° C., in the presence of a catalyst/solvent which promotes diamond-diamond bonding.

Commercially available sintered diamond compacts have a variety of microstructures. An unleached polycrystalline diamond ("PCD") compact having a temperature stability of up to about 700° C.–750° C., can be formed, for example, in accordance with U.S. Pat. No. 3,609,818. In this patent, diamond powder is mixed with graphite powder and a metal catalyst/solvent such as cobalt, and subjected to HPHT conditions to form a polycrystalline compact having sintered diamond-diamond bonds. Catalyst/solvents for sintered diamond compacts include cobalt, nickel, iron, other Group VIII metals, and alloys containing these metals. Diamond compacts usually have a diamond content greater than 70% by volume, with 80–95% being typical. An unbacked compact can be mechanically bonded to a tool body.

Sintered compacts of polycrystalline CBN can be made, for example, in accordance with the teachings of U.S. Pat. Nos. 3,767,371, 3,742,489 and 4,403,015. Catalyst/solvents for CBN include aluminum, or an aluminum alloy including nickel, cobalt, iron, manganese or chromium.

The compact can be bonded to a substrate such as cemented tungsten carbide by subjecting a layer of diamond powder and a mixture of tungsten carbide and cobalt powders to HPHT conditions. The cobalt diffuses into the diamond powder during processing and therefore acts as both a solvent/catalyst for the sintering of the diamond powder to form diamond-diamond bonds and as a binder for the tungsten carbide. By this method, strong bonds are formed at the interface between the diamond layer and the cemented tungsten carbide. See, for example, U.S. Pat. No. 3,745,623 and 4,403,015.

The strength and wear resistance of sintered compacts are comparable or superior to single-crystal diamonds, but they become thermally degraded and their cutting efficiency deteriorates significantly above 750° C. It is believed that this is due to thermal stress resulting from uneven thermal expansion between the diamond and the catalyst/solvent phase and a graphitization of the diamond by the catalyst at high temperature. Differential expansion rates between the compact and the backing can also cause delamination or cracking at their interface.

A compact with improved thermal stability is described in U.S. Pat. No. 4,224,380, which teaches a method of leaching most of the catalyst/solvent from the compact, yielding a primarily metal free, unbacked coherent diamond-diamond bonded abrasive compact. The diamond compact is 70 to 90 percent by volume diamond, 0.05 to 3 percent by volume catalyst/binder, and 5 to 30 percent porous. Unbacked or free-standing leached compacts are thermally stable up to 1,200° C. without significant structural degradation. The compact is commercially available under the tradename "Geoset TM ". Such compacts are somewhat brittle.

The porosity of the Geoset can also be a source of weakness, decreasing the compact's strength, wear and impact resistance. In U.S. Pat. No. 4,636,253, a compact's porosity is decreased by adding a metal or carbide selected from Groups IVA, VA or VIA of the Periodic Table and an iron group metal to the diamond powder before HPHT treatment. Most of the iron group metal is then leached out. By this process, the porosity of the compact is decreased to 7% or less.

A further example of an improved thermally stable sintered diamond compact is disclosed in British Patent Application No. 2,158,086. There, the compact comprises a mass of polycrystalline diamond of about 80 to 90 percent and a second phase of silicon and/or silicon carbide of about 10 to 20 percent of the volume of the compact. The silicon is infiltrated into the compact during HPHT treatment. This compact is said to be capable of withstanding temperatures of 1,200° C. under vacuum, inert or reducing atmospheric conditions, but the silicon or silicon carbide increases the brittleness of the compact.

Another characteristic affecting the properties of sintered polycrystalline compacts is the grain size of the crystals. The finer the grain size, the higher the wear resistance of the compact because, in part, only small particles chip off under a stress. Small grained compacts provide a fine finish and are preferred in machining applications.

A compact with too fine a structure and with a high degree of diamond-diamond bonding, however, can act more like a large single crystal than an aggregate of smaller crystals. The resulting hardness and high modulus of elasticity associated with the dense diamond-diamond bonding makes such compacts prone to crack propagation. Sufficient stress could therefore cause a catastrophic fracture, breaking the entire compact.

The fine diamond powder starting material required to manufacture fine grained compacts also cause material handling and processing problems which lower process yields and cause inconsistent product quality. The dense powder impedes infiltration of a catalyst/solvent, therefore sintering fine grain crystals is difficult. The increased surface area of the fine grain crystals increases their sensitivity to surface impurities while cleaning and packing small grain crystals is also difficult. The problems are particularly acute when a larger compact is desired or where the diamond feedstock particle size required is less than 6 microns. Fine grained diamond compacts also suffer the same thermal limitations as the compacts discussed above.

In addition to their use in compacts, superabrasive particles have been used to impregnate abrasive cutting elements such as abrasive grinding wheels and saw blades. For example, U.S. Pat. No. 2,818,850 discloses a cutting element formed of tungsten carbide powder, cobalt and diamond dust. See also U.S. Pat. No. 2,796,706. The diamond concentration in such mixtures is typically less than 40%. The presence of the diamond improves the cutting efficiency of the carbide matrix, but superabrasive compacts with higher diamond concentrations are superior. Furthermore, since the diamonds appear to be held in the tungsten carbide matrix by weak mechanical bonds, the small diamond grit is easily lost as the supporting matrix is eroded away.

To improve the bonding of the diamond grit to the carbide matrix, diamond particles have been coated with metals such as tungsten, tantalum, chromium, niobium or molybdenum. U.S. Pat. Nos. 3,871,840 and 3,841,852 apply chemical vapor deposition to metal coat diamond grit which is dispersed in a metal matrix. There, the coated diamond comprises approximately 25% of the abrasive products. PCD's, however, are still superior in terms of hardness, wear resistance and range of application.

More recently, U.S. Pat. No. 4,378,975 disclosed an abrasive product with superabrasive particles occupying up to 40% of the volume of the product. The particles are coated preferably by chromium and a wear resistant outer layer such as a nickel/iron based alloy. The particles are bonded together in a nickel/chromium alloy matrix, which has a melting point below 1,100° C. The abrasive product is formed by mixing the coated superabrasive particles with a powder of the alloy, applying pressure at ambient temperature to form a green state product and sintering the green state product at approximately 950° C.–1,000° C., well below the diamond stable region. The chromium coating can comprise up to 10% of the weight of the particles while the diameter of the coated particle, including the wear resistant coating, can be 2-3 times the diameter of an uncoated particle. The low diamond concentration of the product limits its properties compared to PCD's and its thermal stability is low. Mixing and packing problems with the powders of the different components may prevent a uniform distribution of diamond particles in such a matrix, which can result in non-uniform mechanical and thermal characteristics.

Metal coatings have also been applied to products of higher diamond concentration. For example, U.S. Pat. No. 3,879,901 describes a compact of 65% diamond, formed of diamond grit coated with titanium or molybdenum, held in a matrix of an iron alloy which can include silicon. The matrix can also comprise cemented tungsten carbide with 10% cobalt. The diamond grit is mixed with powders of the matrix, and processed at HPHT conditions to form the compact. The compact is not backed. While the presence of cobalt, iron or nickel in the matrix could cause thermal instability due to thermal mismatch and back conversion, it might not be a problem at this relatively low diamond concentration. If the concentration of diamond were to be increased, however, the resulting product would probably have low thermal stability.

U.S. Pat. No. 3,650,714,describes a method of coating natural diamond products with a thin layer of titanium or zirconium to improve their bonding to metal, resin or ceramic matrices. The metal coating can comprise up to 5% of the volume of the coated diamond. An additional layer of nickel or copper can be added to prevent oxidation of the inner titanium or zirconium layer or subsequent processing can be performed in a non-oxidizing atmosphere. It has been found however, that the thin layer can be penetrated by liquid binders used in later processing, degrading the metal coating. European Patent Application No. 0,211,642, also states that metal coating polycrystalline diamond cutting elements with a thin layer of titanium or chromium improves their adhesion to a tungsten carbide matrix of the bit body of a cutting tool.

SUMMARY OF THE INVENTION

In accordance with the present invention, there is provided a thermally stable superabrasive cutting element and a method for making the same. The cutting element comprises a plurality of individually metal coated superabrasive particles wherein the metal coatings between adjacent particles are bonded to each other, forming a cemented matrix. In the case of diamond superabrasives, the metal coating should be a carbide-former and can be chosen from the groups IVA, VA, VIA, or alloys thereof. Tungsten, tantalum and molybdenum are preferred metals for the coating, with tungsten the most preferred.

In a preferred embodiment, the matrix can further comprise a binding aid improving the bonding between the metal coatings. A binding aid with thermal expansion characteristics close to that of diamond, such as silicon, is preferred in order to maintain the thermal stability of the compact. Less preferably, a catalyst/solvent such as cobalt or a non-catalyst metal such as copper can also be used, although with decreased mechanical and thermal properties.

Optionally, uncoated superabrasive particles of a size smaller than the coated superabrasives may be dispersed in the interstices between the coated particles. Such uncoated particles can be sintered together in the presence of the binding aid, yielding a cemented/sintered cutting element.

In accordance with a further significant aspect of the invention, the metal coated superabrasive particles may comprise thermally stable polycrystalline fine grained sintered aggregates for improved wear resistance.

A cutting element in accordance with the invention can be free-standing or backed. The free-standing superabrasive cutting element can have a brazeable layer on one side for improved bonding to a supporting substrate of a tool. Because of their relatively high thermal stability and their brazeability, cutting elements made in accordance with this invention find a wide variety of uses. The cutting elements may be used in drill bits, in dressing or cutting tools, in machining and woodworking tools, and in wire drawing dies. Cutting elements according to the present invention have superabrasive particle concentrations of at least approximately 70% and preferably at least 80% by volume of the compact.

In accordance with the method of the present invention, a plurality of metal coated superabrasive particles are placed in a mold and are subjected to high pressure and high temperature, bonding the metal coatings of adjacent particles together. In a preferred embodiment, the coated particles can be exposed to a binding aid during HPHT, by mixing a powder of the binding aid with the particles or placing a layer of the binding aid adjacent to the coated particles in the mold for infiltration at HPHT. In another embodiment, uncoated superabrasive particles can be mixed with the coated particles before HPHT. A powder or disc of a backing or brazeable layer can be inserted into the mold prior to HPHT as well.

By coating the superabrasive before forming the compact, the formation of self bonds between the superabrasive particles is essentially avoided. It is believed that diamond-diamond bonds are a cause of some of the problems with prior art compacts, such as massive fracture under impact loading. The metal coating also, to a substantial degree, protects the diamond from exposure to catalyst metals which can be present in the matrix or can diffuse from a backing. This minimizes graphitization or back conversion of the diamond to graphite during later exposure to elevated temperature, one source of the thermal instability of sintered polycrystalline compacts. The metal coating also endows the compact with sufficient electrical conductivity so that it may be cut by a conventional travelling wire electrical discharge machine.

While in the method of the present invention the bonds between the metal coatings of adjacent particles are formed by sintering, the resulting structure is termed "cemented" with respect to the superabrasive particles because they are bonded to the matrix support structure. "Sintering" as used herein refers to the formation of diamond-diamond or CBN-CBN bonds under HPHT conditions.

DETAILED DESCRIPTION OF THE INVENTION

Figure 1:
FIG. 1 is a scanning electron photomicrograph of the polished surface of a cemented diamond cutting element in accordance with the invention.

The superabrasive cutting element according to the present invention comprises superabrasive particles coated with and bonded to a carbide-former selected from the Groups IVA, VA or VIA or alloys thereof. The coatings of adjacent particles are bonded together at the high pressures and temperatures of the diamond forming region in the process of the invention, forming a cemented matrix comprised of the coating metal and/or its carbide. The process of the present invention is described more fully below. The photomicrograph of FIG. 1 shows an example of a cutting element of the present invention, magnified 160 times.

Tungsten, tantalum and molybdenum are the preferred metals for use in coating diamond particles. Tungsten is most preferred because it is oxidation resistant, its thermal expansion characteristics are the closest to that of diamond among the carbide forming transition metals, and it has a high melting point. Tantalum and molybdenum share these characteristics to a lesser degree. Tantalum or titanium are preferred for coating CBN because they are good boride and nitride formers and have similar thermal expansion characteristics as CBN.

During exposure to HPHT conditions or prior heat treatment, the inner surface of the metal coating forms a carbide (boride or nitride) layer as a result of reacting with the carbon of the diamond (boron or nitrogen of CBN). Depending on the thickness of the coating and the processing conditions, the rest of the coating may react to form a carbide, boride or nitride, or, if the coating is thick enough, may remain metal. Bonds holding diamond superabrasive particles together may therefore be from diamond to carbide to metal to carbide to diamond, or from diamond to carbide to diamond. In either case, strong chemical bonds are formed. Although not thoroughly understood, it is believed that the bond between the diamond and the metal carbide layer is an atom to atom bond between the carbon of the diamond and the carbide.

The volume of the coating can be between 4–30% of the volume of the coated diamond. The diamond concentration of the compact is greater than about 70% by volume of the cutting element, with concentrations over 80% being preferred. The preferred coating volume is between about 8–12% of the volume of the coated diamond. A 10% volume coating is approximately equivalent to a 1.5 micron coating on a diamond with an average diameter of 100 microns. A thicker metal coating would cause a lower diamond concentration in the compact, with a corresponding decrease in desired properties, such as strength and wear resistance. If the coating is too thin, on the other hand, increased diamond-diamond bonds may form during HPHT treatment in the process of the present invention, resulting in potential instabilities such as brittleness and back conversion. The compacting and handling of the coated particles in the process of the present invention, discussed below, could cause some chipping of the metal coatings, which could expose the diamond to sintering to adjacent diamonds. There is not enough diamond to diamond bonding to have a deleterious effect on the properties of the compact, however.

Preferably, the matrix of the cutting element further comprises a binding aid which improves the strength of the cemented structure and decreases its porosity. The binding aid wets the metal coatings, assisting in the formation of bonds between the coatings. Depending on the binder, there may be chemical and/or mechanical bonding with the metal coatings, as well. The binder can comprise up to 18% by volume of the compact.

The preferred binding aids are silicon or silicon or boron containing compounds such as silicon nitride ($Si_3N_4$), silicon carbide (SiC) and boron carbide ($B_4C$). These preferred binding aids have thermal expansion characteristics close to those of diamond, decreasing potential thermal stresses. In addition, these binding aids have only a small catalytic effect on diamonds and back conversion of any exposed diamond is minimal.

Silicon is the most preferred binding aid because its thermal expansion most closely matches that of diamond. In fact, as illustrated in the examples below, compacts incorporating a binding aid of silicon have thermal stability comparable with conventional free-standing leached PCD cutters. Silicon reacts with the tungsten and tungsten carbide of the matrix, forming silicon carbide (SiC) and tungsten silicides (e.g. $Si_2W$), which increase the overall strength of the compact. The silicon can also form a carbide with the diamond exposed by chipped metal coatings. The brittleness problem experienced with prior art thermally stable compacts containing silicon is alleviated by the presence of the metal/metal carbide portion of the matrix, which is ductile.

Since the diamonds are coated and there is only minimal diamond exposure, it is believed that catalyst/solvent binding aids such as cobalt, nickel or iron or other Group VIII metals, can also be used with reduced concern over temperature instability due to back conversion during use at temperatures over 750° C. A cutting element utilizing cobalt can be stronger than one of silicon, up to about 700° C. At higher temperatures, the element is weakened due to thermal instabilities. A free-standing cutting element utilizing cobalt as a binding aid would be a good alternative to conventional free standing PCD's in applications involving temperatures less than 800° C. A volume concentration in the cutting element of less than 4% catalyst/solvent is sufficient to achieve the strong bonding between the coating particles and this low concentration mitigates somewhat the thermal instability caused by the catalyst binder. Cross-sectional analysis of the cutting element with cobalt as a binding aid shows some contact between the diamond and the cobalt, in addition to that caused by diamond exposure due to chipped coatings. This suggests that some cobalt diffuses through the metal/metal carbide coating. The tests discussed below show that backed cutting elements utilizing cobalt according to the present invention, are thermally stable up to at least 1000° C. This is better than the thermal stability of prior art backed PCD's and the present backed cutting elements offer a good alternative. Other embodiments of the present invention which utilize cobalt as a binding aid, can exhibit thermal stability over 1,100° C. These are discussed below.

Metals such as copper, tin or other Group IB, IIB, IIIB or IVB metals and alloys thereof, can also be used as binding aids. These metals have lower melting points than the other binding aids discussed and therefore the resulting compact has lower thermal stability than other embodiments discussed. Furthermore, copper and related metals and alloys do not react chemically with the coatings on the particles and so only provide mechanical bonds with the metal coatings. This causes somewhat lower wear resistance.

A combination of silicon and titanium, for example, in a silicon/titanium alloy, can also be used as a binding aid with good results.

Figure 2:
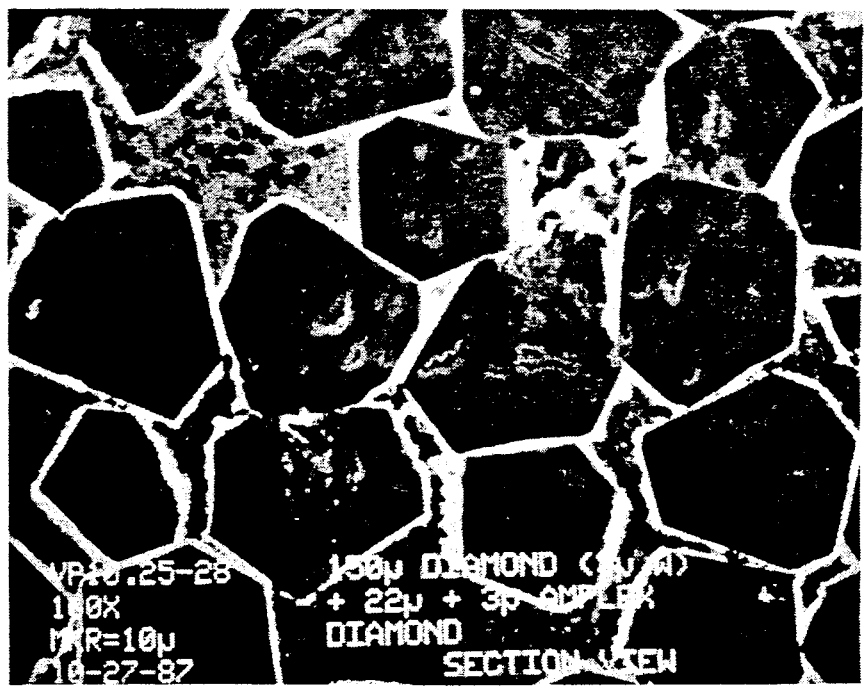
FIG. 2 is a photomicrograph of the polished surface of a cemented/sintered diamond cutting element in accordance with the invention.

In another preferred embodiment of the present invention, the cutting element additionally includes one or more powders of uncoated, smaller sized superabrasive particles which lie in the interstices between the coated particles. These smaller particles can comprise up to 20% by volume of the cutting element, decreasing its porosity and increasing its diamond content. The uncoated particles sinter to each other in the presence of the binding aid, and bond to the first and second phase matrices. A cutting element utilizing two different sized particles can be referred to as bimodal. If an additional, smaller superabrasive powder is added, the cutting element can be termed trimodal. A photomicrograph of a trimodal cutting element with a cemented/sintered structure magnified 160 times, is shown in FIG. 2.

The cemented metal/metal carbide structure in multimodal compacts can be formed completely of the metal coating on the superabrasive particles, which carbides with a small amount of the carbon of the uncoated particles. To improve bonding with the uncoated particles, a fine powder of the metal, such as tungsten, can also be added to the mixture before HPHT. For adequate dispersion, the nominal diameter of the added metal powder should be any size smaller than that of the smallest uncoated particle for dispersion.

The coated superabrasive particles have nearly spherical diameters of less than 1 micron to approximately 1,000 microns, with typical compacts being composed of coated particles of between 10 to 200 microns. The use of uniformly sized coated particles is preferred for better packing, but is not required. In a sample of coated particles with an average diameter of 90 microns, for example approximately 80% of the particles will be between 85-95 microns, with the remaining particles above and below that range.

The smaller, uncoated diamonds can be of any size smaller than the coated particles. It has been found, however, that utilizing vibrational packing methods, better mixing and packing results when the smaller particles are approximately one-sixth to one-ninth the size of the next larger particle. Such a relation between the sizes of the particles have been found to improve the packing density of the cutting element as the smaller particles fit in the intersticies among the larger particles, and are therefore preferred. As shown in FIG. 2, the presence of the smaller, uncoated particles can increase the distance between the larger, coated particles somewhat.

Figure 3:
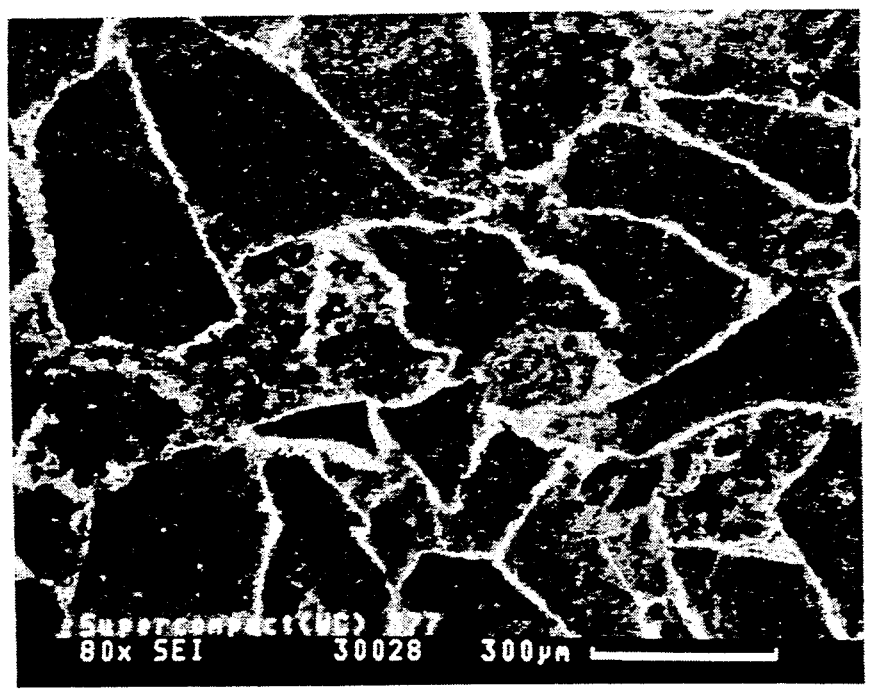
FIG. 3 is a photomicrograph of a cemented/sintered diamond cutting element utilizing coated film grain sintered diamond aggregates in accordance with the present invention.

In accordance with another aspect of the invention, the metal coated diamond particles may themselves be formed of sintered fine grained polycrystalline aggregates for improved wear resistance. Otherwise, the compact is identical to the other embodiments discussed. The aggregates are roughly uniformly sized, with a nominal diameter between approximately 20-1000 microns. The preferred range is about 50-250 microns. The use of fine grain aggregates improves the wear resistance relative to conventional compacts while the cemented matrix decreases the risk of crack propagation common in fine grained sintered compacts. FIG. 3 is a photomicrograph of a compact in accordance with the present invention, comprised of coated fine grain sintered diamond aggregates, magnified 80 times.

Figure 4A:
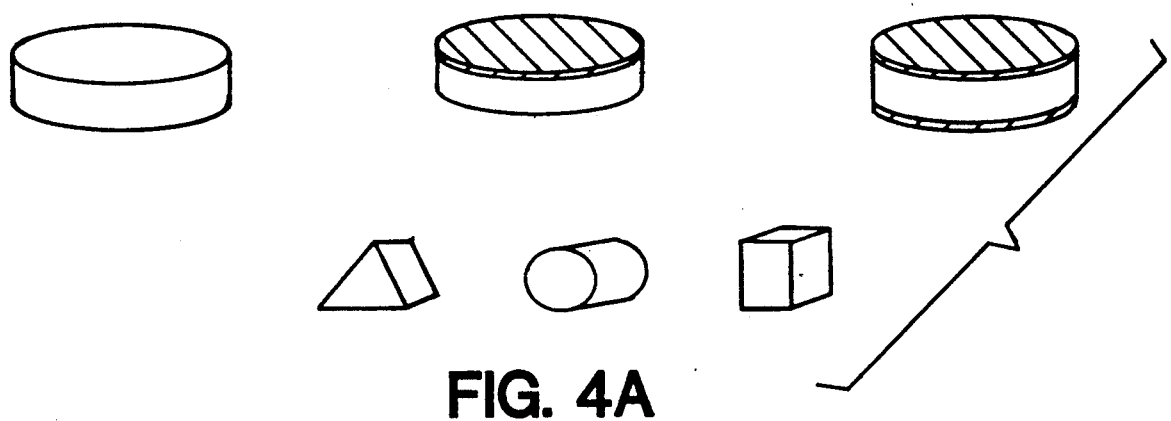
FIG. 4a illustrates various shapes of the free-standing cutting elements of the present invention, with and without a brazeable layer.

A free-standing cutting element can have a thin brazeable layer on one or more sides for bonding to a supporting tungsten carbide substrate of a tool in ambient conditions. The layer can comprise a 0.020 inch layer of an oxidation resistant carbide former such as tungsten, titanium or molybdenum, or a carbide thereof, such as tungsten carbide. Carbide formers and their carbides are preferred because they are erosion resistant. They also form good metallic bonds with the cutting element and the substrate. The use of the brazeable layer enables bonding to the tool substrate at non-HPHT conditions. FIG. 4a shows free-standing cutting elements in accordance with the present invention, with and without a brazeable layer. A sandwich structure with a brazeable layer on opposite sides of a PCD compact can also be formed as shown in FIG. 4a. The sandwich structure is particularly useful in the woodworking industry.

Figure 4B:
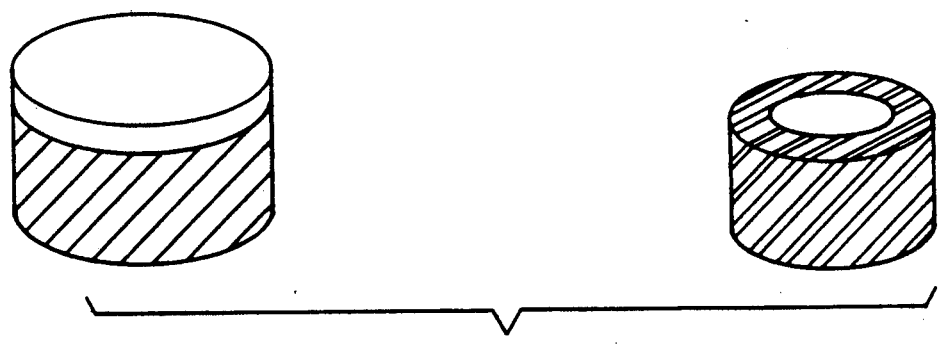
FIG. 4b illustrates backed compacts according to the present invention.

A cutting element according to the present invention can also be bonded to a backing, forming a backed compact. Cemented tungsten carbide is one preferred backing. A ceramic substrate comprising silicon compounds such as $Si_3N_4$, or silicon carbide, or other silicon or boride containing compounds can also be used. FIG. 4b shows a backed compact in accordance with the present invention. The cutting elements shown in FIGS. 4a and 4b can be used in drill bits, in dressing or cutting tools, in machining and woodworking tools, and in wire drawing dies. Diamond products similar to those shown in FIGS. 4a and 4b can also be used as bearing elements, for example, in a down hole drilling motor used in oil/gas directional drilling.

The cutting elements shown in FIGS. 4a and 4b can be made to any desired shape or configuration using a traveling wire electrical discharge machine ("EDM"). In general, such systems materials by electrical spark erosion. As the cutting wire nears the workpiece, sparks are discharged from the cutting wire and erode small pieces of material from the workpiece surface. The eroded material is flushed from the workpiece with deionized water.

Conventional thermally stable cutting elements made from polycrystalline diamond compacts cannot be cut by EDM machines because they are not sufficiently electrically conductive. Geoset compacts do not contain any metallic interstitial components to be electrically conductive, while the presence of Si/SiC in Syndax-3 polycrystalline diamond compacts available from De Beers renders them unsuitable for cutting by EDM systems. The diamond-to-diamond self-bonding characteristic of these compacts also reduces their suitability to EDM cutting systems. They are usually formed to a specific shape in situ, or cut to shape with lasers. However, the metallic matrix in the cutting elements of the present invention provides sufficient electrical conductivity so that they may be cut to any desired shape or configuration by conventional traveling wire EDM machines.

In yet another aspect of the present invention, a thermally stable cemented PCD product can be made in accordance with the HPHT techniques taught herein, including, for example, the use of a binding aid as taught herein, and thereafter crushed by mechanical means to produce a grit formed from crushed aggregates. The crushed aggregates may be further ball milled for breaking up into even smaller grits. Grits formed from such crushed aggregates can then be sized using sieves of various mesh sizes (10/20, 20/35, 35/50, 50/60, 60/80, etc.). The sized material can then be cleaned with a suitable solvent and (optionally) coated using standard coating techniques with one or more layers of a carbide forming metal, e.g., tungsten, molybdenum, chromium, titanium, niobium, or zirconium. The coating layer on these crushed aggregates can be in the range of about 5 to 100 microns thick, preferably about 10 to 20 microns thick. Such crushed aggregates may be chemically incorporated in a matrix tool body. For example, crushed aggregates of 60/80 size would be useful in grinding wheels, while crushed aggregates of 10/20 size are useful for saw blades and drill bits.

Backed compacts according to the present invention exhibit thermal stability up to at least 1000° C., which is superior to conventional backed compacts, thermally stable up to 800° C. See Examples 1–7, and Table I below. The different embodiments disclosed improve thermal stability in different ways. For example, as shown in Example 1, a backed trimodal compact can be thermally stable up to 1,100° C. While the reason for this is not fully understood, it is believed that the mixture of fine grains of uncoated superabrasive particles and the tungsten or tungsten carbide of the matrix might form a transition layer of intermediate thermal characteristics between the matrix of cobalt which diffuses into the compact from the backing, and the diamond, relieving some thermal stress. This improvement in thermal stability is exhibited in multimodal compacts including fine uncoated superabrasive powder having a maximum diameter less than approximately 4 microns.

The thermal stability of a backed compact can also be improved in accordance with the present invention by the use of a thin compliant layer 500 microns thick between the cutting element and the backing, which acts as a thermal transition between the two sections. This layer comprises a fine superabrasive powder between 0.5–10 microns, mixed with a Group IVA, VA or VIA metal, such as tantalum. Alternatively, the compliant layer comprises a fine superabrasive powder with particles between 0.5–10 microns in diameter on average which particles have been coated with a thin layer of a Group IVA, VA or VIA metal, such as tantalum. The compliant layer helps to avoid delamination between the cutting element and the backing and also retards the diffusion of cobalt during HPHT. Testing of Example 3, below, indicated that a compact of this type is thermally stable up to 1,000° C.

A compact utilizing silicon as a binding aid, formed by placing a silicon disc or powder layer between the cemented tungsten carbide backing and the compact, as discussed in the process below, showed thermal stability over 1,100° C. in Example 5. It is believed that the silicon layer retards the diffusion of cobalt into the compact during HPHT.

Boron doped diamonds can also be used as the superabrasive particles and are potentially superior in terms of thermal stability to non-boron doped diamonds. Quality inconsistencies, however, make their use uncertain at this time.

Superabrasive particles can be coated with metal by conventional techniques known in the art, such as chemical vapor deposition or sputtering, for use in the process of the present invention. Chemical vapor deposition of tungsten from tungsten hexaflouride can be conducted for 3 hours at 700° C., for example.

After coating, the particles are cleaned by high temperature firing between 950° C.–1,150° C. for 2 hours in a vacuum or in reducing gas atmosphere, such as hydrogen. This high temperature treatment also causes chemical bonding to occur between the superabrasive particle and the metal coating, forming the carbide, boride or nitride layer.

Cutting elements are formed in accordance with the present invention by placing coated superabrasive particles into a mold and subjecting the mold to the High Pressure and High Temperature conditions of the diamond forming region. An appropriate mold is a tantalum cup, which can be tapped or shaken to settle the particles. Pressures and temperatures are typically between 40–80 kbars and 1,200° C.–2,000° C., respectively, for between 5–60 minutes. 15 minutes is generally preferred. The high pressure compresses and consolidates the particle layer, decreasing voids which cause porosity in the compact. Under HPHT conditions, the metal coatings bond to each other and to the diamonds to form the cemented matrix.

In a preferred process, a binding aid is inserted into the mold prior to the HPHT treatment. The binding aid is preferably added in the form of a disc placed adjacent to the superabrasive particles in the mold for infiltration during the HPHT treatment. It is preferred to place the binding aid disc on one side of the superabrasive particles because as it infiltrates, the binding aid can pick up and carry impurities which are deposited at the end of the compact and can be ground off. If infiltrated from both ends, the impurities tend to concentrate in the middle of the compact, providing a potential source of instability. Alternatively, the binding aid can be coated on the metal coated superabrasive or mixed with the superabrasive particles in powdered form by, for example, vibrational packing techniques known in the art and discussed in more detail below. It is difficult to get an uniform distribution of powder among the coated particles, however, this is alleviated somewhat by the high pressures and high temperatures of the process. Wetting by the binding aid and the high pressures of the HPHT treatment cause a slight rearrangement of the particles, allowing further settling and packing.

When silicon is used as the binder in a free-standing cutting element, infiltration should occur prior to significant bonding between the metal coatings. This can be done by conducting the HPHT treatment at least 1,300° C. for 15 minutes at 55 kbars. The melting point of silicon is between 1,200° C.–1,300° C. at this pressure and the silicon will melt and infiltrate before much bonding between the metal coatings has taken place. The silicon can improve their bonding by first wetting the metal coatings.

If a catalyst solvent such as cobalt is used as a binding aid, it is preferred in the process to mix a powder of the binding aid with the coated particles before HPHT. Infiltration is not recommended, since it is difficult to control the amount of cobalt infiltrating into the compact.

In another embodiment of the process, uncoated superabrasive particles smaller than the coated particles are added to the mold before HPHT. As stated above, if one size of uncoated particles is used, it is preferred that the smaller particles be 1/6–1/9 the size of the larger coated particles. If a trimodal cutting element is being made, it is preferred that the smallest uncoated particles be 1/6–1/9 the size of the intermediate sized particles. The combination of particles can be uniformly mixed and densely packed by, for example, the "True-Vibrational Packing Technique," which is known in the art. A Dual Mode$^{TM}$ Power Amplifier, Model Number APS 114, a Perma-Dyne Shaker, Model Number APS 120S, controlled by a 2 MHz Function WaveTek Generator, Model 20, manufactured by Acoustic Power Systems Corporation, can be used to provide adequate vibration for mixing and packing. The operating parameters for this machine are given in the examples below. The smallest particles may be so fine that they float, preventing their dispersion between the other particles during vibration. These fine particles can be suspended in methanol and poured into the mixture of larger particles The entire mixture is then vibrated and the methanol will assist in interstitially dispersing the fine particles among the larger particles. It will then evaporate.

In a further embodiment of the process of the present invention, the coated superabrasive particles can be fine grained sintered aggregates. Sintered abrasive aggregates can be formed, for example, by crushing and screening commercially available thermally stable sintered polycrystalline diamond compacts such as the Geoset or Syndax, or sintered polycrystalline CBN ("PCBN") such as BZN or amborite. Used or fractured PCD's from other applications can be used as starting materials as well. By utilizing commercial PCD's or fragments thereof, the manufacturing problems inherent in the use of fine grain powders can be avoided.

To prepare polycrystalline aggregate particles for use in compacts in accordance with the present invention, the sintered PCD compacts are crushed to the desired size and then thoroughly cleaned by boiling in acid, such as aqua regia, a concentrated solution of 3 parts nitric acid and 1 part hydrochloric acid. These grits are then rinsed with deionized water, and dried at high temperature. High vacuum firing at about 1300° C. and $10^{-5}$ torrs for 1 hour removes oxygen, water and impurities. The PCD grits can then be optionally treated with chemical, ceramic, or metallic additives to decrease their porosity. After metal coating by conventional coating techniques, the coated grits are dealt with in the same manner as described herein in connection with monocrystalline coated particles.

A powder or disc comprising an oxidation resistant carbide former or a carbide thereof can be added to the mold on one side of the diamond particle layer prior to the HPHT treatment to form a brazeable layer on a free-standing compact.

A backing layer material may be placed adjacent the cutting element before HPHT to form a backed compact. The backing can comprise a preformed cemented tungsten carbide disc or a powder of tungsten carbide mixed with cobalt, or a disc or powder of a different ceramic backing. When manufacturing a cemented tungsten carbide backed compact, it is difficult to control the amount of cobalt which infiltrates into the compact during HPHT treatment, therefore volume percentages above 2 must be tolerated.

Cobalt infiltration from the backing can be impeded to some degree by placing a silicon disc between the backing and compact particles prior to the HPHT treatment. The silicon should infiltrate prior to the diffusion of the cobalt which has a melting point of 1,400° C. at 55 kbars. In one process, the HPHT cell is heated to 1,300° C. for 10 minutes, allowing the silicon to melt and substantially infiltrate. Then the temperature is increased to 1,450° C. for 5 minutes to adequately bind the tungsten carbide backing and bond the backing to the particles. Alternatively, the HPHT can be conducted at 1450° C. for 15 minutes.

A compliant layer comprising a mixture of fine superabrasive powder and metal powder or metal coated fine superabrasive powder, can also be placed between the backing and the mixture of particles before HPHT treatment for improved thermal stability. Layers of silicon or boron containing compounds can also be used.

The following examples illustrate the processes of the present invention and the resulting products. The cutting element and compact formed in each of the examples are comprised of approximately 82% diamond, 5% metal coating and 12% binder material by volume. Examples 1–7 involve backed compacts. The wear resistance test results are listed in Table I.

EXAMPLE 1

0.6 grams of diamond particles having a nominal diameter of 150 microns and a tungsten coating of 3 microns were cleaned by high temperature firing at between 950° C.–1,150° C. for 2 hours in a vacuum or reducing gas atmosphere in a Lindberg Box Furnace. They were then loaded into a protective tantalum cup. The cup was placed into the holding fixture of an APS 120S permanent magnet and electrodynamic vibrational packing table controlled by a Wavetek 2 MH$_2$ Function Generator Model 20. 0.16 grams of uncoated diamond having an nominal 22 micron diameter were cleaned by boiling in aqua regia and then rinsed in deionized water. The uncoated diamond particles were then dried and fired at 1,050° C. for 2 hours in a hydrogen gas atmosphere. They were added to the cup and dispersed in the interstices of the larger coated diamonds by vibration. The powder packing was induced by vibration of 300–500 Hz, 1–2g acceleration, 1–5 micron amplitude, with 12–24 psi compacting pressure, for 3–5 minutes. 0.1 grams of a third, submicron uncoated diamond powder of between 0.5–1 microns, was similarly cleaned and suspended in methanol. The suspension was added to the cup and vibrationally dispersed in the remaining interstitial voids. The methanol assists in the diffusion of the small particles into the mixture. The resulting mixture was 80 volume percent diamond.

A cobalt cemented tungsten carbide backing disc, approximately 13–16 weight percent of cobalt, was fit snugly on top of the diamond layer inside the cup. The reaction cup was loaded into a HPHT cell assembly and subjected to 1,450° C. at 55 kbs for 15 minutes. The resulting trimodal tungsten carbide supported cemented/sintered body was taken out of the assembly and finished to a desired shaped product by conventional techniques such as surface grinding, lapping and outer diameter grinding.

The wear resistance and thermal stability of the compact was determined by testing the wear ratio (ratio of the volume of rock removed to the volume of the compact removed during cutting) of the compact at various temperatures. The finished compact was attached to a tool holder by a clamp. Barre granite was wet cut with the lathe at a cutting speed of 300 sfm (surface feed per minute), a depth of cut of 0.005 inches per revolution, and a feed of 0.012 inches, to determine the wear ratio at room temperature. The compact was then removed and heat treated for 20 minutes in a closed graphite container at 800° C. It was then reattached to the tool holder for additional wear resistance testing. This process was repeated at 50° intervals between 850° C.–1,000° C., and at 1,100° C. and 1,200° C. The existence of thermal instability was determined by examining the product after each heat treatment for structural degradation such as cracking or delamination between the cutting element and the backing. Thermal degradation cannot always be visually determined, particularly when the thermal threshold temperature is approached. In such a case, thermal instability is indicated by decreased wear resistance. Conventional PCD cutters such as GE 2541 and DeBeers Improved Syndrill were similarly tested for comparison The results indicated that this trimodal compact was thermally stable up to 1,100° C., despite the presence of cobalt from the backing. The conventional backed PCD cutters failed due to interface delamination at about 825° C. As discussed above, the superior thermal stability exhibited by this compact was possibly due to the fine superabrasive crystals acting as a thermal expansion buffer.

EXAMPLE 2

0 9 grams of 150 micron diamond particles coated with a 3 micron tungsten layer were cleaned as above and loaded into the tantalum cup with a cobalt cemented tungsten carbide disc. The diamonds were not vibration packed. The assembled cup was subjected to HPHT as in Example 1. The resulting cemented diamond structure comprised a cemented metal/metal carbide support structure of tungsten and tungsten carbide, with a small amount of cobalt.

Testing as in Example 1 showed temperature stability up to 900° C., which is better than the conventional cemented tungsten carbide backed PCD's but not as good as the compact of Example 1.

EXAMPLE 3

0.4 grams of 150 micron boron doped diamonds with a 2 micron tungsten coating were cleaned as above and placed in a tantalum cup with a mixture of 0.65 grams of 50% by volume fine diamond powder of 4 microns and 50% fine tantalum powder of 1 micron placed on top. The cobalt cemented tungsten carbide disc was fit snugly on top of the powder layer in the cup and subjected to HPHT.

The resulting compact contained a cemented PCD layer With a compliant layer of the fine grain sintered PCD at the tungsten carbide interface with the backing. Testing in accordance with the method described in Example 1 indicated that this sample was temperature stable up to 1,050° C.

EXAMPLES 4–7

Tungsten coated diamond feed of the following dimensions were cleaned and loaded in the tantalum cup for each of the examples indicated below. A layer of pure silicon 0.010 inches thick, was placed on top of the diamond layer, followed by a cobalt cemented tungsten carbide disc. HPHT treatment was conducted for 10 minutes at 1,300° C. and 5 minutes at 1,450° C.

EXAMPLES 4 0.9 grams of 40 micron diamond with 0.1 micron tungsten coating 5 0.9 grams of 40 micron diamond with 0.7 micron tungsten coating 6 0.9 grams of 150 micron natural diamond with 3 micron thick tungsten coating 7 1.0 grams of 300 micron diamond with 2.5 micron tungsten coating Testing as described in Example 1 indicated improved thermal stability and wear resistance as compared to ordinary PCD compacts. The greater improvement was shown in Examples 5–7, which had thicker tungsten coatings than Example 4. The thermal stability of the compact was preserved by the infiltration of the silicon, which retarded the diffusion of cobalt. Delamination between the backing and the compact occurred at about 1,050° C., compared to 850° C. for the conventional compacts. The additional mass of the silicon binder decreased the porosity of the compact and improved its overall bulk strength. These results are listed in Table I, below. Subsequent testing of WC-backed cutting elements similar to those of Examples 4–7 but with different diamond feedstocks and controlled HPHT process temperature showed temperature stability as high as 1,150° C. and a higher wear-ratio. As an example, a WC-backed compact made out of on avg. 40 micron diamond with 0.7 micron thick W-coating showed the following wear ratios at various temperatures before it failed at 1200° C.: $2.0 \times 10^5$ (room temp.), $1.6 \times 10^5$ (800° C.), $1.5 \times 10^5$ (1000° C.), $1.3 \times 10^5$ (1050° C.), $2.0 \times 10^5$ (1100° C.), $1.1 \times 10^5$ (1150° C.).

TABLE I

CEMENTED TUNGSTEN CARBIDE BACKED COMPACTS
WEAR RATIO vs. TEMPERATURE

| Example | Room Temperature | 800° C. | 850° C. | 900° C. |
|---|---|---|---|---|
| 1 | $1 \times 10^5$ | $5.0 \times 10^4$ | $7.0 \times 10^4$ | |
| 2 | $2.1 \times 10^5$ | $2.5 \times 10^5$ | $1.1 \times 10^5$ | $1.6 \times 10^4$ |
| 3 | $2.9 \times 10^5$ | | $1.1 \times 10^4$ | |
| 4 | $2.1 \times 10^5$ | $1.9 \times 10^5$ | $1.6 \times 10^5$ | $1.8 \times 10^5$ |
| 5 | | $1.4 \times 10^5$ | | $9.8 \times 10^4$ |
| 6 | $2.6 \times 10^5$ | | | $8.4 \times 10^4$ |
| 7 | $3.7 \times 10^4$ | $4.1 \times 10^4$ | $5.8 \times 10^3$ | $3.5 \times 10^4$ |
| GE 2541 | $3.5 \times 10^5$ | $1.1 \times 10^5$ | X | |
| Improved Syrdrill | $2 \times 10^6$ | $1.6 \times 10^6$ | X | |

| Examples Continued | 950° C. | 1000° C. | 1100° C. | 1200° C. |
|---|---|---|---|---|
| 1 | $4.2 \times 10^4$ | | $1.1 \times 10^4$ | X |
| 2 | X | | | |
| 3 | | | $1.2 \times 10^4$ | X |
| 4 | X | | | |
| 5 | $1.1 \times 10^5$ | $7.4 \times 10^4$ | $1.3 \times 10^4$ | X |
| 6 | $1.6 \times 10^5$ | $5.6 \times 10^4$ | | |
| 7 | $3.5 \times 10^4$ | $9.4 \times 10^3$ | X | |
| GE 2541 Improved Syndrill | | | | |

X indicates delamination.

The following examples of free-standing compacts were prepared and tested as discussed below. The results of the testing of these samples by the method described in Example 1, conducted at 100° C. intervals between 900°–1,200° C., are listed in Table II.

EXAMPLE 8

0.6 grams of 175 micron boron doped diamond particles with 2 micron tungsten coatings, and 0.25 grams of 22 micron uncoated diamonds were cleaned as above and mixed with 0.15 grams of $Si_3N_4$ powder with nominal diameters between 0.1–0.9 microns, as a binding aid. The mixture was vibrated in the tantalum cup and subjected to HPHT a in Example 1.

A comparison of the resulting free-standing binded cemented compact with commercially available free-standing diamond sintered compacts such as GE 2102 and 2164 showed comparable thermal stability up to 1,200° C., but the present compact showed a lower wear ratio. The Syndax-3 compact fractured during testing due to its high brittleness.

EXAMPLES 9 and 10

1.7 grams of 70 micron particle size boron doped synthetic diamond particles with a tungsten coating of 0.25 microns were cleaned and loaded into the tantalum cup. A cobalt disc (5.7 percent by weight iron) was placed on top of the diamond layer. A free-standing cutting element was formed having a mixed cemented and sintered structure. The thin metal coating and the cobalt caused some diamond-diamond bonding.

In Example 10, 3.0 grams of boron doped synthetic diamond particles of 175 microns diameter and a 5 micron tungsten coating were similarly prepared, yielding a cemented body with cobalt uniformly dispersed in the tungsten/tungsten carbide matrix. The thicker tungsten coating prevented the formation of diamond-diamond bonds.

Test results indicated wear ratios comparable to ordinary compacts at room temperature but deterioration began at approximately 800° C. Massive structural degradation occurred at around 1,000° C., which was probably due to the thermal expansion mismatch between the cobalt and the diamond, and back conversion. Analysis of cross-sectional samples indicated that cobalt was in contact with the surface of the diamond, suggesting diffusion through the metal coating layer, as well as chipping of the coating by compaction during processing. Free-standing cutting elements utilizing cobalt according to the present invention are good alternatives to conventional PCD's in low temperature applications.

EXAMPLES 11–17

Tungsten coated diamond particles of the following dimensions were cleaned and loaded in the tantalum cup, with a silicon powder or disc placed either on top, or on top and underneath the diamonds, as indicated. In examples 12–14, a brazeable layer of the indicated materials was included as well.

EXAMPLES 11 2.7 grams of 70 micron boron doped diamonds with a 7.0 micron tungsten coating, 0.23 grams of a mixture of a powder of silicon, including rhenium (10% by weight) placed on top 12 2.1 grams of 90 micron diamonds with 1.0 micron tungsten coating, 500 micron thick silicon disc placed on top, 1.5 grams tungsten powder with 12 micron nominal diameter 13 2 grams of 90 micron diamond coated with 1 micron of tungsten, 250 micron silicon discs placed on top and bottom, 500 micron thick molybdenum disc placed adjacent one layer of silicon 14 1.9 grams of 90 micron diamond coated with 1.5 microns of tungsten, 500 micron silicon disc placed on top, 1.5 grams of tungsten powder with 12 microns nominal diameter placed above silicon layer 15 1.8 grams of 90 micron diamonds with 0.5 micron tungsten coating 500 micron, silicon disc placed on top 16 2.3 grams of 175 micron diamonds with 2 micron tungsten coating, 500 micron silicon placed on top 17 1.9 grams of 300 micron diamonds with 2 micron tungsten coating, 250 micron silicon disc placed on top The wear ratio data is shown in Table II to be comparable to those of the commercially available compacts. Sample 14 was successfully brazed into a tungsten carbide disc using a standard silver solder braze alloy, such as Easy-Flo 45 from the Handy and Harman Co. The sample was shear tested by placing the substrate into the fixture of an Ingstron machine. A gradually increasing force was applied to the side of the cutting element, until it separated from the substrate. The shear strength, or the force which caused separation, was 18,000 psi.

TABLE II

FREESTANDING CUTTING ELEMENTS WEAR RATIO vs. TEMPERATURE

| Example | Room Temperature | 900° C. | 1000° C. | 1100° C. | 1200° C. |
|---|---|---|---|---|---|
| 8 | $2.9 \times 10^4$ | $1.6 \times 10^4$ | | $1.0 \times 10^4$ | $7.1 \times 10^3$ |
| 9 | $3.1 \times 10^5$ | | $4.4 \times 10^3$ | CRACK | |
| 10 | $1.8 \times 10^5$ | | $5.3 \times 10^3$ | CRACK | |
| 11 | $2.0 \times 10^5$ | | | | $4.2 \times 10^5$ |
| 12 | $2.5 \times 10^5$ | | $1.3 \times 10^5$ | | $2.1 \times 10^5$ |
| 13 | $2.2 \times 10^5$ | | $2.0 \times 10^5$ | | $1.5 \times 10^5$ |
| 14 | $3.0 \times 10^5$ | | $1.8 \times 10^5$ | | $2.2 \times 10^5$ |
| 15 | $2.5 \times 10^5$ | | | | $1.2 \times 10^5$ |
| 16 | $1.6 \times 10^5$ | | | | $2.2 \times 10^5$ |
| 17 | $2.3 \times 10^5$ | | | | |
| GE2102 | $1.0 \times 10^5$ | | $9.0 \times 10^4$ | $6 \times 10^4$ | $5.0 \times 10^4$ |
| GE2164 | $6.0 \times 10^5$ | $2.6 \times 10^5$ | | $2.5 \times 10^5$ | $1.5 \times 10^5$ |
| DEBEERS SYNDAX-3 | $1.2 \times 10^5$ | | | | $1.0 \times 10^5$ |

The following examples illustrate the use of fine grained sintered polycrystalline diamond compacts as the starting material for the compact. The aggregates were cleaned by boiling in aqua regia, and rinsed with deionized water. They were dried, high vacuum fired at about 1,300° C. and $10^{-5}$ torrs for 1 hour, and then coated with tungsten to the indicated thicknesses. The coated particles were cleaned as above. The results of the testing of these samples by the method of Example 1, are listed in Table III.

EXAMPLE 20

2.4 grams of 200 micron PCD aggregate starting material coated with 4 microns of tungsten was loaded in the tantalum cup. A silicon disc 0.020 inches thick, was placed on top of the diamond layer and processed as above. A free-standing cemented compact was obtained. A comparison with Table II indicates that this cutting element has higher wear resistance and thermal stability than existing commercial products such as GE's Geoset or DeBeers' Syndax-3.

TABLE III

SINTERED POLYCRYSTALLINE AGGREGATE FEEDSTOCK WEAR RATIO vs. TEMPERATURE

| Example | Room Temperature | 800° C. | 850° C. | 1000° C. | 11000° C. | 1200° C. |
|---|---|---|---|---|---|---|
| 18 | $1.6 \times 10^5$ | $1.3 \times 10^5$ | Delamination | | | |
| 19 | $5.7 \times 10^4$ | | | $1.0 \times 10^5$ | | $1.2 \times 10^5$ |
| 20 | $4.2 \times 10^5$ | | | | | $6.6 \times 10^5$ |

EXAMPLE 18

0.8 grams of 200 micron PCD crushed aggregate feed with 4 micron thick tungsten coatings were loaded in the Ta-cup. A cobalt cemented tungsten carbide (6 percent by weight cobalt) backing disc was fit snugly on top of the diamond layer.

HPHT treatment for 10 minutes at 1450° C. and 55 kbs yielded a tungsten carbide supported cemented/sintered compact which was finished as described in Example 1.

Comparison to the conventional backed cutters tested in Table 1 showed somewhat higher thermal stability and comparable wear resistance. Structural degradation began at about 800° C. in each case. An interface layer crack in the compact at the tungsten carbide/diamond interface (delamination) occurred at about 825° C.

EXAMPLE 19

0.8 grams of crushed PCD aggregate feed of 250 microns were coated with 5 microns of tungsten and were loaded in the tantalum cup. A pure silicon disc 0.010 inches thick was placed on top of the diamond layer, followed by a cobalt cemented tungsten carbide disc. HPHT treatment as in Example 18 was applied.

Test results showed that the cemented/sintered compact was thermally stable up to approximately 1,100° C., at which point the diamond layer began to show cracks, but there was no obvious interface layer delamination.

EXAMPLE 21

In this Example a silicon titanium alloy was used as a binding aid. The Si/Ti alloy was prepared containing 90 wt % Si and 10 wt % Ti. A disc of the Si/Ti alloy 0.020 inches thick was placed on top of a 90 micron (average) diamond starting material coated with a 1 micron thick layer of tungsten. The reaction-cup assembly was HPHT processed as above to form a free-standing PCD compact which was tested for wear resistance. The wear ratio was found to be $3.1 \times 10^5$ at room temperature, $3.4 \times 10^5$ at 1000° C., and $1.8 \times 10^5$ at 1200° C.

EXAMPLE 22

1.7 grams of a 90 micron (average) diamond starting material was coated with 0.5 microns of molybdenum, cleaned in a hydrogen atmosphere, and loaded into a tantalum cup. A silicon disc 0.020 inches thick was placed on top of the diamond layer and a tantalum disc 0.004 inches thick placed on top of the Si disc. A cup was then crimped over the Ta disc to enclose the mass. The charge assembly was then exposed to a pressure of about 55 Kbs at a temperature of about 1450° C. for approximately 15 minutes. A free-standing cemented compact was obtained and tested for wear resistance by a rock lathe granite turning test. The results are summarized below.

TABLE IV

Mo COATED DIAMOND FEEDSTOCK WEAR RATIO vs. TEMPERATURE

| Sample | Room Temperature | 1000° C. | 1200° C. |
|---|---|---|---|
| 1 | $1.8 \times 10^5$ | $1.5 \times 10^5$ | $1.1 \times 10^5$ |
| 2 | $2.9 \times 10^5$ | $1.4 \times 10^5$ | $1.7 \times 10^5$ |
| 3 | $2.2 \times 10^5$ | $1.8 \times 10^5$ | $1.2 \times 10^5$ |
| 4 | $2.4 \times 10^5$ | $1.6 \times 10^5$ | $1.6 \times 10^5$ |
| Avg. | $2.33 \times 10^5$ | $1.58 \times 10^5$ | $1.4 \times 10^5$ |

EXAMPLE 23

Free standing cutting elements 0.530 inches in diameter and 0.100 inches thick were prepared in a mold as described above. Thereafter, the cutting elements were cut into the shapes shown in FIG. 4(a) on a Charmilles-/Andrews Model EF-320 Travelling Wire Discharge Machine at a cutting rate of 2.8 in/hr. Two types of wires, copper and bass, both 0.01 inches in diameter were used successfully. Because of their high thermal stability, uniform electrical conductivity and brazeability, these cutting elements can be incorporated into various different kinds of tools by known conventional tool fabrication techniques such as brazing or matrix metal/binder infiltration. Even for free-standing PCD product with no bondable layer, its brazeability onto the conventional Co/WC substrate was demonstrated using a commercially available braze alloy (e.g., Incusil and Ticusil, two braze alloys available from the Westgo Co.).

The cutting elements and backed compacts according to the present invention are either superior or comparable to their prior art counterparts. Free-standing cutting elements of the present invention utilizing silicon as a binding aid are thermally stable up to 1200 C with no signs of major structural degradation or noticeable graphitization. See examples 9 and 11-17. This is comparable to the thermal stability of conventional PCD's such as Geoset and Syndax-3. Backed compacts according to the present invention with a cemented tungsten carbide backing and a silicon infiltrant are thermally stable up to 1,000° C. A trimodal as well as mono-size fine grained backed compact utilizing fine diamond powder showed thermal stability up to 1,150° C. The use of a compliant layer without silicon infiltrant demonstrated thermal stability up to 1,000° C. See Examples 1-7. These compacts show superior thermal stability compared to the prior art backed PCD's such as GE 2541 and Syndrill, which become thermally degraded between 750° C.-850° C., as shown in Table I. Cutting elements and backed compacts comprising coated fine grained sintered aggregates show higher wear resistant and comparable or superior thermal stability as compared to conventional PCD's. See Table III. In addition, due to the presence of the matrix, the present invention is more resistant to crack propagation than conventional PCD's. The cemented metal/metal carbide support structure also decreased the hardness and modulus of elasticity of the compact, as compared to conventional PCD's, improving its impact resistance. The brittleness of prior art compacts utilizing silicon is also decreased by the metal matrix.

I claim:

1. A thermally stable superabrasive product comprising a plurality of "metal coated superabrasive particles", said superabrasive particles having a hardness at least equal to that of diamond or cubic boron nitride, said metal being selected from Groups IVA, VA, VIA and alloys thereof, "said coating forming a matrix cementing said superabrasive particles together into a coherent mass" of high structural strength having a predetermined configuration, said superabrasive particles comprising at least 70% by volume of said coherent mass, said metal coating comprising about 4 to 30% of the volume of said coherent mass.

2. The superabrasive product of claim 1 wherein said product is a cutting element for a drill bit.

3. The superabrasive product of claim 1 wherein said product is a cutting element for a dressing tool.

4. The superabrasive product of claim 1 wherein said product is a cutting element for a machining tool.

5. The superabrasive product of claim wherein said product is a cutting element for a woodworking tool.

6. The superabrasive product of claim 1 wherein said product is a cutting element for a wire drawing die.

7. The superabrasive product of claim 1 wherein said product is a cutting element for a cutting tool.

8. The superabrasive product of claim 1 wherein said product is a bearing element.

9. A thermally stable superabrasive product comprising a plurality of metal coated superabrasive particles, said superabrasive particles having a hardness at least equal to that of diamond or cubic boron nitride, said metal being selected from Groups IVA, VA, VIA and alloys thereof, said coating forming an electrically conductive, matrix cementing said superabrasive particles together into a coherent mass of high structural strength so that said mass may be cut by a wire electrical discharge machine, said superabrasive particles comprising at least 70% by volume of said product.

10. The product of claim 9 wherein said matrix further comprises a binding aid which wets said metal coatings and is located between said metal coated particles.

11. The product of claim 10 wherein said binding aid is silicon.

12. The product of claim 10 wherein said binding aid is a mixture of silicon and titanium.

13. The product of claim 10 wherein said binding aid is a silicon or boron containing compound.

14. The product of claim 9 wherein said metal is selected from the group consisting of tungsten, tantalum and molybdenum.

15. The product of claim 9 wherein said metal is tungsten.

16. The product of claim 9 wherein said metal coating comprises about 4 to 30% by volume of said product.

17. The product of claim 9 wherein said metal coating comprises about 8 to 10% by volume of said product.

18. The product of claim 9 further comprising uncoated superabrasive particles smaller than said coated superabrasive, particles, said uncoated superabrasive particles being dispersed among said coated particles.

19. The product of claim 9 further comprising a brazeable layer on at least one side of said cutting element, said brazeable layer comprising an oxidation resistant carbide former or a carbide thereof.

20. The product of claim 19 wherein said brazeable layer is chosen from the group consisting of tungsten, molybdenum, titanium, and tungsten carbide.

21. The product of claim 9 further comprising brazeable layers on opposite sides of said cutting element, said brazeable layer comprising an oxidation resistant carbide former on a carbide thereof.

22. The product of claim 9 further comprising a backing member bonded to said mass.

23. The product of claim 22 wherein said backing member comprises a ceramic substrate of silicon containing compounds.

24. The product of claim 22 wherein said backing member comprises cemented tungsten carbide.

25. A thermally stable superabrasive product comprising a plurality of uniformly sized grits, each of said grits comprising a plurality of metal coated superabrasive particles, said superabrasive particles having a hardness at least equal to that of diamond or cubic boron nitride, said metal being selected from Groups IVA, VA, VIA and alloys thereof, said coating forming a matrix cementing adjacent superabrasive particles in each of said grits into a coherent mass of high structural strength, said superabrasive particles comprising at least 70% by volume of said grits, said metal coating comprising about 4 to 30% by volume of said grits.

26. The product of claim 25 wherein said grits are of 10/20 mesh size.

27. The product of claim 22 wherein said grits are of 20/35 mesh size.

28. The product of claim 22 wherein said grits are of 35/40 mesh size.

29. The product of claim 22 wherein said grits are of 50/60 mesh size.

30. The product of claim 22 wherein said grits are of 60/80 mesh size.

31. The product of claim 25 further comprising a second metal coating on top of said grits, said second metal being selected from Groups IVA, VA and VIA, said second metal coating being in the range of 5 to 100 microns thick.

32. The product of claim 31 wherein said second metal coating is 10 to 20 microns thick.

33. A method for manufacturing a superabrasive grit comprising the step of: placing a plurality of individually metal coated superabrasive particles in a mold, said superabrasive particles having a hardness at least equal to that of diamond or cubic boron nitride, said metal being chosen from the Groups IVA, VA, VIA, or an alloy thereof; subjecting the contents of said mold to high pressure and high temperature for bonding said metal coatings of said coated particles to the metal coatings of adjacent coated particles to form a coherent mass of high structural strength; and crushing said coherent mass into individual grits.

34. A method as in claim 33 further comprising inserting a binding aid which wets said coating into said mold prior to subjecting said mold to said high pressure and high temperature.

35. A method as in claim 33 further comprising selecting said individual grits by size to produce uniformly sized grits.

36. A method as in claim 34 wherein said individual grits are selected by size by passing them through a mesh.

37. A method as in claim 33 further comprising dispersing uncoated superabrasive particles with said coated superabrasive particles prior to said subjecting step, said uncoated particles being smaller than said coated superabrasive particles.

38. A method as in claim 33 further comprising coating said grits with a metal selected from Groups IVA, VA, and VIA, and alloys thereof.

39. A method as in claim 33 wherein said coated superabrasive particles are sintered polycrystalline aggregates.

* * * * *